United States Patent [19]

Pietzsch et al.

[11] 4,059,012
[45] Nov. 22, 1977

[54] FORCE SENSING DEVICE

[75] Inventors: Ludwig Pietzsch; Knud Overlach, both of Karlsruhe, Germany

[73] Assignee: Dr. -Ing. Ludwig Pietzsch, Ettlingen, Germany

[21] Appl. No.: 725,347

[22] Filed: Sept. 21, 1976

[30] Foreign Application Priority Data

Apr. 27, 1976 Germany .............................. 2618359

[51] Int. Cl.² .............................................. B01L 1/22
[52] U.S. Cl. ...................................... 73/141 A; 338/5
[58] Field of Search .................. 73/88.5 R, 141 A; 338/5, 6

[56] References Cited

U.S. PATENT DOCUMENTS

| 1,623,238 | 4/1927 | Frost et al. | 73/141 A |
| 2,440,706 | 5/1948 | Tint | 73/141 XA |
| 2,503,304 | 4/1950 | Stainback | 73/88.5 X |
| 3,033,034 | 5/1962 | Ziggel | 73/141 A |

FOREIGN PATENT DOCUMENTS 704,163  2/1954  United Kingdom ............. 73/141 A

Primary Examiner—Charles A. Ruehl
Attorney, Agent, or Firm—Burns, Doane, Swecker & Mathis

[57] ABSTRACT

The invention relates to a force sensing device which is to be inserted in a force transmitting structural member, like a rope, especially a rope for lifting a jib or a load of a crane. The force sensing device has a flat body provided with weak locations at which strain measuring devices are fixed. The flat body is dimensioned with respect to a high degree of safety against overload, to high duration working stability and reproducibility as well as to a simple and cheap production.

11 Claims, 3 Drawing Figures

FORCE SENSING DEVICE

BACKGROUND OF THE INVENTION

The invention concerns a force sensing device and more specifically a force sensing device wich may be inserted in a force transmitting structural member like a rope and is itself designed as a force transmitting member. Such a force sensing device may comprise a body, having two connection through openings at opposed ends of the body, a central through hole of greater diameter than the connection openings, said through hole being closed at both ends and having fixed on its inner wall at least one strain measuring element.

Force sensing devices of that kind work according to the principal of strain transformation. They have very precisely dimensioned weak portions in a section normal to the force transmitting direction, the strain in such weak portions being greater than in the structural member. In the area of such weak portions strain measuring devices, e.g. strain gauges, are arranged, which measure the strain and transform it into a proportionate output signal, which e.g. may be in the form of an electric voltage.

A known force sensing device of the kind specified above is described in German utility model 72 07 482, filed on Feb. 2, 1972, accepted on May 18, 1972.

The known device does not fully satisfy the requirements of duration, working stability and safety and last not least of a simple and cheap production. The weak portions of the prior art device are formed by reducing the thickness of the flat body along a part of its length, which makes the production expensive. When inserted in a rope, which is a preferred application of the force sensing device of the invention, an angle deflection of the force direction with respect to the length axis of the force sensing device cannot be prevented. The force direction therefore may not be adjusted parallel or in the length axis of the flat body. This may generate high stresses in the body and the strain measuring devices of the known device. The ends of the known device are comparatively thick. This favours the generation of unwelcomed bending moments, as in practice a straight uniform abutment of a connecting member like a bolt of the structural member in the connection opening and therefore a symmetrical force transformation may not be realised.

It is an object of the invention to provide a force sensing device of the kind as specified above, which overcomes the draw backs of the prior art device.

It is a further object of the invention to provide a force sensing device, which is safer against overloading.

It is another object of the invention, to provide a force sensing device, which is insensitive against a limited angle deflection of the force direction with respect to the length axis of said device.

It is still another object of the invention to provide a force sensing device, which may be produced more simply and with less costs as the known device.

It is further an object of the invention to provide a force sensing device which is apt for the measuring of a crane load and fulfills the very restrictive safety requirements for crane overload safety devices, wherein the device is to be inserted in the rope for lifting the jib of the crane, or the rope for lifting the load.

In order to fulfill these and other objects a force sensing device of the kind as specified comprises according to the invention a flat body having between two connection openings at opposed ends of the body a central through hole of greater diameter than the connection openings, said through hole being closed at both ends and having fixed on its inner wall at least one strain measuring element, wherein the flat body has a constant small thickness over its total length and a constant width at least in the body portion extending along the distance of the centers of the connection openings and the diameter of the central through hole and thickness and width of the flat body are dimensioned such that the stress produced by nominal load at the weakest section of the body between the central hole and the longitudinal rim is lower than the proportional limit and amounts at most to $\frac{1}{3}$ of the yield stress of the body material and spherical bearings are inserted in the connection openings, said bearings accomodating usual connection elements like shackles for connecting the sensing device to the structural member.

With the force sensing device according to the invention the weak portion is achieved alone by reducing the dimension in widthwise direction of the flat body, i.e. at the weakest location between the through bore and the lengthwise rims of the flat body and not by a local reduction of the thickness of the flat body. This remarkably simplifies the production, because the flat body may be cut simply from rod or strip material which preferably is heat treated and grinded before cutting instead of being produced by forging of a precut raw piece of steel.

The uniform pretreating of the rod or strip material, which leaves a drilling to be performed in order to produce the central through hole and the connection openings leads to a more precise and reproducible dimensioning of the body, especially of the weak portions thereof.

The spherical bearings in the connection openings provide for an ideal force introduction even in cases, in which the force direction is not exactly adjusted to the length axis of the force sensing device. This feature contributes essentially to the high duration of the force sensing device according to the invention. The spherical bearings are technical elements in common use, which are cheaply to be obtained and therefore do not remarkably influence the production costs. The bearing bores of the bearings are dimensioned for common connection elements, e.g. shackles or the like, the other ends of which are connected to the structural member.

The thickness of the flat body is preferably as small as possible and dimensioned such, that the spherical bearings extend over the flat surfaces of the body at both sides. This contributes to most favourable conditions for the force transmission and helps to prevent bending.

Diligent dimensioning of the flat body is most important for an optimal compromise between high efficiency and safety on the one hand and cheap and simple production on the other hand. Preferred dimensions will become apparent in detail from the claims. It is to be noted, however, that only after thoroughly studying the stress distribution and the flat body it has been found, that not the weakest location of the section of the flat body between the through hole and the length rim of the flat body but rather the stronger section between the inner wall of the connection opening and the lengthwise rim are most critical. This is presumably to be explained by the higher so-called "notch sensibility" or stress concentration at the last mentioned location, where the distance of the connection opening from the end rim is important. It has been found, that a dimension at this location with a ratio of the distances of the wall of the connection opening to the end rim and to the length rim of the flat body in the range between 1.2 and 1.5 is particularly advantageous. This reduces the notch sensibility as compared with a known device, in which said ratio is 1.0 or even smaller.

These and other features and objects of the invention will become apparent from the claims and from the following description when read in conjunction with the apended drawings.

THE DRAWINGS

DETAILED DESCRIPTION

Figure 1:
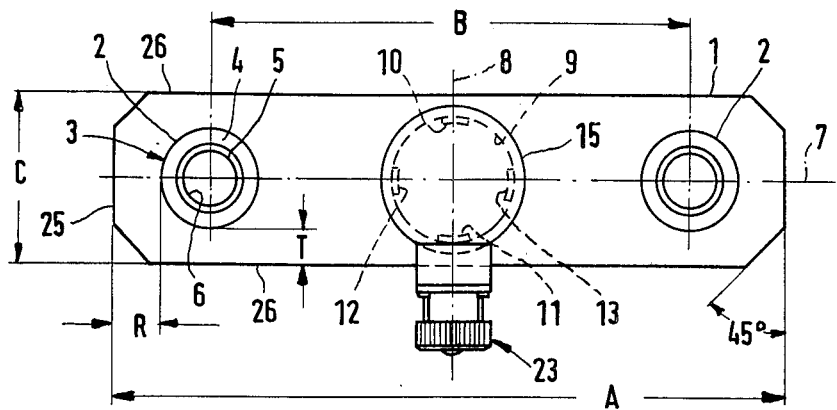
FIG. 1 is a top view of a force sensing device of the present invention.
Figure 2:
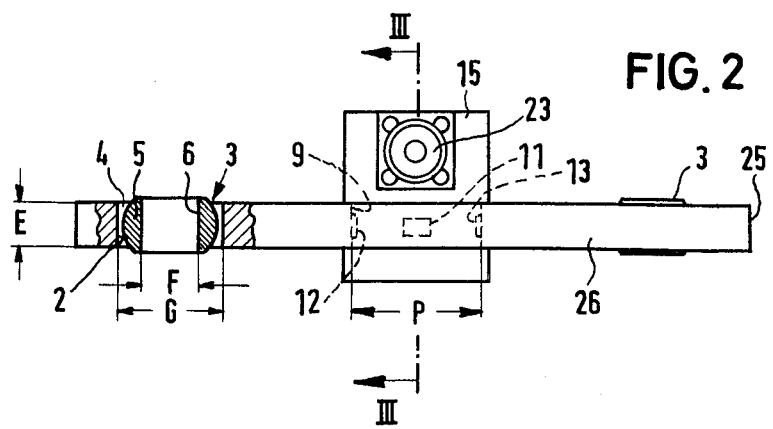
FIG. 2 is a side view of the device of FIG. 1 with parts in section.
Figure 3:
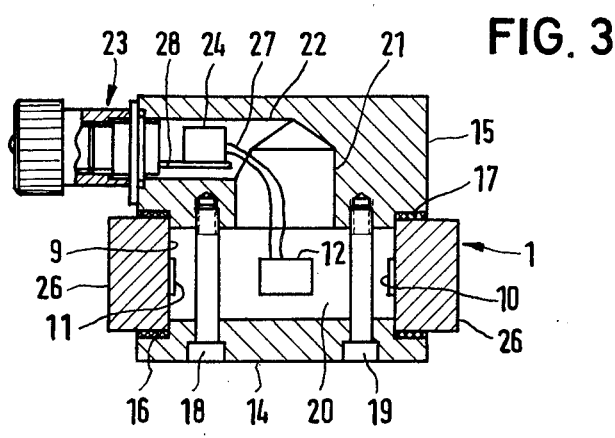
FIG. 3 is a section along line III—III in FIG. 1.

The force sensing device as shown in the figures comprises an elongated flat body 1, which has connection through openings 2 of a diameter G at the opposed ends of its lengths. The diameter G of each connection opening 2 accomodates a spherical bearing 3 with a press fit between its outer ring 4 and the opening 2. Such spherical bearings 3 are commonly traded elements the outer ring 4 of which having a concavely curved inner surface and an inner ring 5 having a convexly curved outer surface, which fits in the concave spherical surface of the outer ring 4. The inner ring has a bearing bore 6 of a diameter F. This bearing bore 6 accomodates a connection element like a common shackle (not shown), which may be connected to a rope or another structural member. In the center of the flat body 1, in which the length axis 7 and the transverse axis 8 are cutting each other with an angle of 90°, the flat body 1 has a central through bore 9 of greater diameter than the connection openings 2. In the plane containing the length axis 7, that plane representing the so called "neutral plane", two pairs of two strain gauges 10, 11 and 12, 13 each are arranged, the strain gauges 10, 11 and 12, 13 of each pair being oppositely adhered to the inner wall of the through bore, the one pair 10, 11 being aligned to the diameter meeting the transverse axis 8, and the other pair 12, 13 being aligned to the diameter meeting the length axis 7 of the through hole 9. The strain gauges 10 to 13 are preferably adhered to the inner wall of the through bore 9. Such orientation and arrangement of the strain gauges compensates for any asymmetry of the force introduction and/or for a not exactly centralised arrangement of the through bore 9 with respect to the center of the flat body 1, where the axis 7, 8 are crossing each other.

The flat body 1 has end rims 25 and longitudinal rims 26.

The through bore 9 is closed at both ends by covers 14 and 15, which are sealed by sealing rings 16 and 17, said sealing rings being pressed by bolts 18 and 19 against the flat surfaces of the flat body 1. Therefore a hollow chamber 20 sealed against obnoxious influences of the surrounding is created, which protects the strain gauges 10 to 13 from unfavourable outer influences and stresses.

It is to be noted, that the strain gauges 10, 11 are directly arranged at the smallest location of the section of the flat body, which is situated in a plane containing the transverse axis 8 which is normal to the flat body. At this location the greatest strain exists which therefore is directly measured by the strain gauges. The electrical junctions of the strain gauges are passed out through an axial blind bore 21 and a further blind bore 22 which extends parallel to the flat body and normal to the first blind bore 21, said blind bores 21, 22 being worked out from the inner side of cover 15. The free outer end of the blind bore 22 is closed by a connection plug 23 passed through by the electrical junctions. In the hollow room which is formed by the chamber 20 and the blind bores 21, 22 further electronic elements may be installed additionally to the strain gauges 10 to 13 which contribute to the transforming of the output signal of the strain gauges, which is proportionately to the force introduced in longitudinal direction of the flat body 1. Preferably the strain gauges are connected to an amplifier 24, which is supported by a supporting member 28 connected to the connection plug 23 and connected to the strain gauges 10 to 13 by conductors 27 (for the sake of clearness only the connection to the strain gauge 12 is shown).

The design and dimensions of the flat body 1 are most significant for the the duration, the precisement of measuring, the reproducibility and at the same time for a simple and cheap production.

The flat body 1 has constant thickness E over its total length A and apart from the ends, which are bevelled under an angle of 45°, constant width C as well with A - total length of flat body 1
B - axial distance of the connection openings 2
C - width of the flat body 1
E - thickness of the flat body 1
F - diameter of the bearing bore of the spherical bearings 3
G - bore diameter of the connection openings 2
P - diameter of the central through hole 9
R - distance of the inner wall of the connection openings 2 from the respective end rim 25
T - distance of the inner wall of the connection openings from each longitudinal rim 26 the following ratios have been proved as specifically useful:

$E/C = 0.15$ to $0.4$; preferably $0.2$ to $0.32$
$P/C \leq 0.9$; preferably $\leq 0.8$
$G/P \leq 0.9$
$B/A \approx 0.7$
$C/A \approx 0.25$ to $0.28$
$R/T = 1.2$ to $1.5$ In the following table examples for useful dimensions of flat bodies 1 worked out from strip or rod material consisting of a stainless ferretic heat-treated chromium steel according to German standard X20Cr $n$ ($n = 13$ and more) are given for different nominal loads:

| nominal load (MP) | 3 | 5 | 10 | 20 | 50 |
|---|---|---|---|---|---|
| A | 237 | 276 | 340 | 480 | 570 |
| B | 170 | 200 | 240 | 340 | 400 |
| C | 60 | 70 | 90 | 126 | 160 |
| E | 17 | 17 | 21 | 27 | 50 |
| F | 25 | 25 | 35 | 45 | 60 |
| G | 42 | 42 | 55 | 68 | 90 |

A force sensing device designed as described in this specification can be produced with minimal material, processing and mounting costs while having in its finished status the required reproducible measurement characteristics as well as being safe against overloads, which could be several times greater than the nominal load, and being insensible against the rough operation conditions which are usual in crane operation and against limited deflection or swivelling of the force direction with respect to its length axis. What is claimed is:

1. A force sensing device, which is to be inserted in a force transmitting structural member like a rope and is itself designed as a force transmitting member, the device comprising a flat body having between two connection openings at opposed ends of the body a central through hole of greater diameter than the connection openings, said through hole being closed at both ends and having fixed on its inner wall at least one strain measuring element, wherein the flat body has a constant small thickness over its total length and a constant width at least in the body portion extending along the distance of the centers of the connection openings, the diameter of the central through hole and thickness and width of the flat body are dimensioned such that the stress produced by nominal load at the weakest section of the body between the control hole and the longitudinal rim is lower than the proportional limit and amounts at most to $\frac{1}{3}$ of the yield stress of the body material, and spherical bearings are inserted in the connection openings, said bearings accomodating usual connection elements like shackles or the like for connecting the sensing device to the structural member.

2. The device of claim 1, wherein the ratio of the thickness (E) to the width (C) of the flat body ranges between 0.15 and 0.40.

3. The device of claim 2, wherein the ratio of the thickness (E) to the width (C) of the flat body ranges between 0.2 and 0.32.

4. The device of claim 1, wherein the ratio of the diameter (P) of the central through hole to the width (C) of the flat body is not greater than 0.9.

5. The device of claim 4, wherein the ratio is not greater than 0.8.

6. The device of claim 1, wherein the ratio of the diameter (G) of the connection openings to the diameter of the central hole is not greater than 0.9.

7. The device of claim 1, wherein the ratio of the distance (B) of the centers of the connection openings to the total length (A) of the flat body is about 0.7.

8. The device of claim 1, wherein the ratio of the width (C) to the length (A) of the flat body ranges between 0.25 and 0.28.

9. The device of claim 1, wherein the ratio of the distances (R, T) of the inner wall of the connection opening to the end rim and to the longitudinal rim of the flat body ranges between 1.2 and 1.5.

10. The device of claim 1, wherein in the longitudinal direction and in the direction normal thereto of the flat body two pairs of oppositely arranged strain gauges are oppositely fixed to the inner wall of the central through hole at the level of the neutral line of the flat body.

11. The device of claim 1, wherein the flat body is made of stainless ferritic chromium steel, which may be heat treated to a strength over 100 kp/mm$^2$.

* * * * *